(12) United States Patent
Kolze et al.

(10) Patent No.: US 9,042,492 B2
(45) Date of Patent: May 26, 2015

(54) STAGGERED TRANSMISSION AND RECEPTION FOR REDUCING LATENCY AND MEMORY

(71) Applicant: BROADCOM CORPORATION, Irvine, CA (US)

(72) Inventors: Thomas J. Kolze, Phoenix, AZ (US); Richard S. Prodan, Niwot, CO (US)

(73) Assignee: Broadcom Corporation, Irvine, CA (US)

( * ) Notice: Subject to any disclaimer, the term of this patent is extended or adjusted under 35 U.S.C. 154(b) by 0 days.

(21) Appl. No.: 13/916,367

(22) Filed: Jun. 12, 2013

(65) Prior Publication Data

US 2014/0003560 A1    Jan. 2, 2014

Related U.S. Application Data

(60) Provisional application No. 61/665,292, filed on Jun. 27, 2012, provisional application No. 61/824,120, filed on May 16, 2013, provisional application No. 61/665,287, filed on Jun. 27, 2012, provisional application No. 61/824,148, filed on May 16, 2013.

(51) Int. Cl.
*H04L 27/06* (2006.01)
*H04L 1/00* (2006.01)

(52) U.S. Cl.
CPC ............ *H04L 1/0041* (2013.01); *H04L 1/0045* (2013.01); *H04L 1/0058* (2013.01); *H04L 1/0066* (2013.01)

(58) Field of Classification Search
CPC ..... H04L 1/0045; H04L 27/22; H04L 25/067; H04L 27/2647
USPC .................. 375/346, 329, 340, 316
See application file for complete search history.

(56) References Cited

U.S. PATENT DOCUMENTS

| | | | |
|---|---|---|---|
| 6,850,563 B1* | 2/2005 | Hulyalkar et al. | 375/233 |
| 2008/0072123 A1* | 3/2008 | Eidson et al. | 714/786 |
| 2010/0275097 A1* | 10/2010 | Choi et al. | 714/758 |
| 2011/0060969 A1* | 3/2011 | Ramamoorthy et al. | 714/773 |
| 2011/0078533 A1* | 3/2011 | Zhou et al. | 714/752 |

* cited by examiner

*Primary Examiner* — Shuwang Liu
*Assistant Examiner* — Helene Tayong
(74) *Attorney, Agent, or Firm* — Garlick & Markison; Bruce E. Stuckman

(57) ABSTRACT

A demodulator processes a continuous-time signal to generate at a plurality of encoded bits. An inner decoder processes a first subset of bits within the plurality of encoded bits to correct selected ones of the first subset of bits to form a corrected first subset of bits and to generate partially corrected data from the plurality of encoded bits based on the corrected first subset of bits. An outer decoder processes the partially decoded data, to correct selected ones of a second subset of the plurality of encoded bits to form a corrected second subset of bits. A bit combiner generates data estimates by combining the corrected first subset of bits and the corrected second subset of bits.

20 Claims, 10 Drawing Sheets

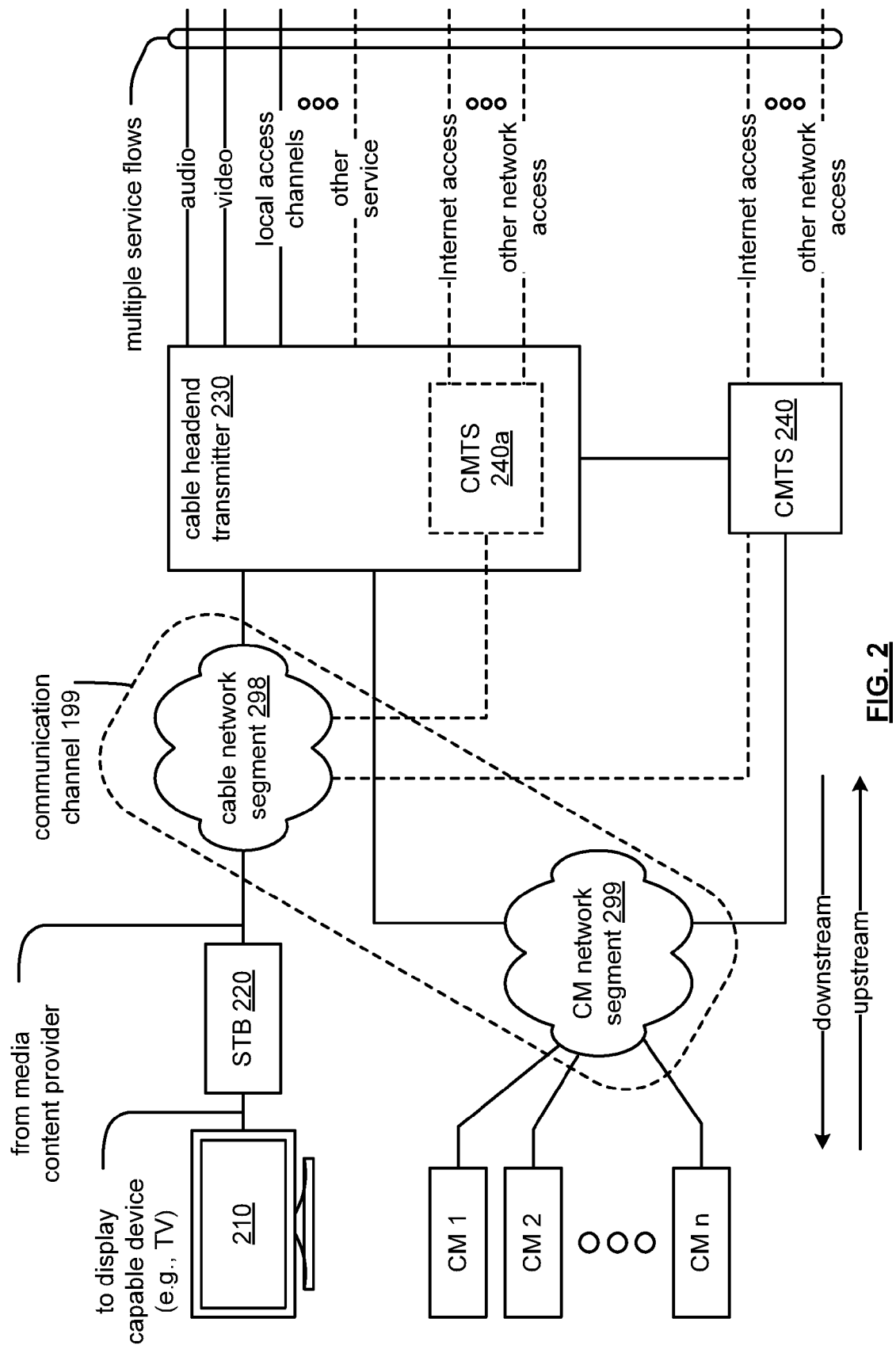

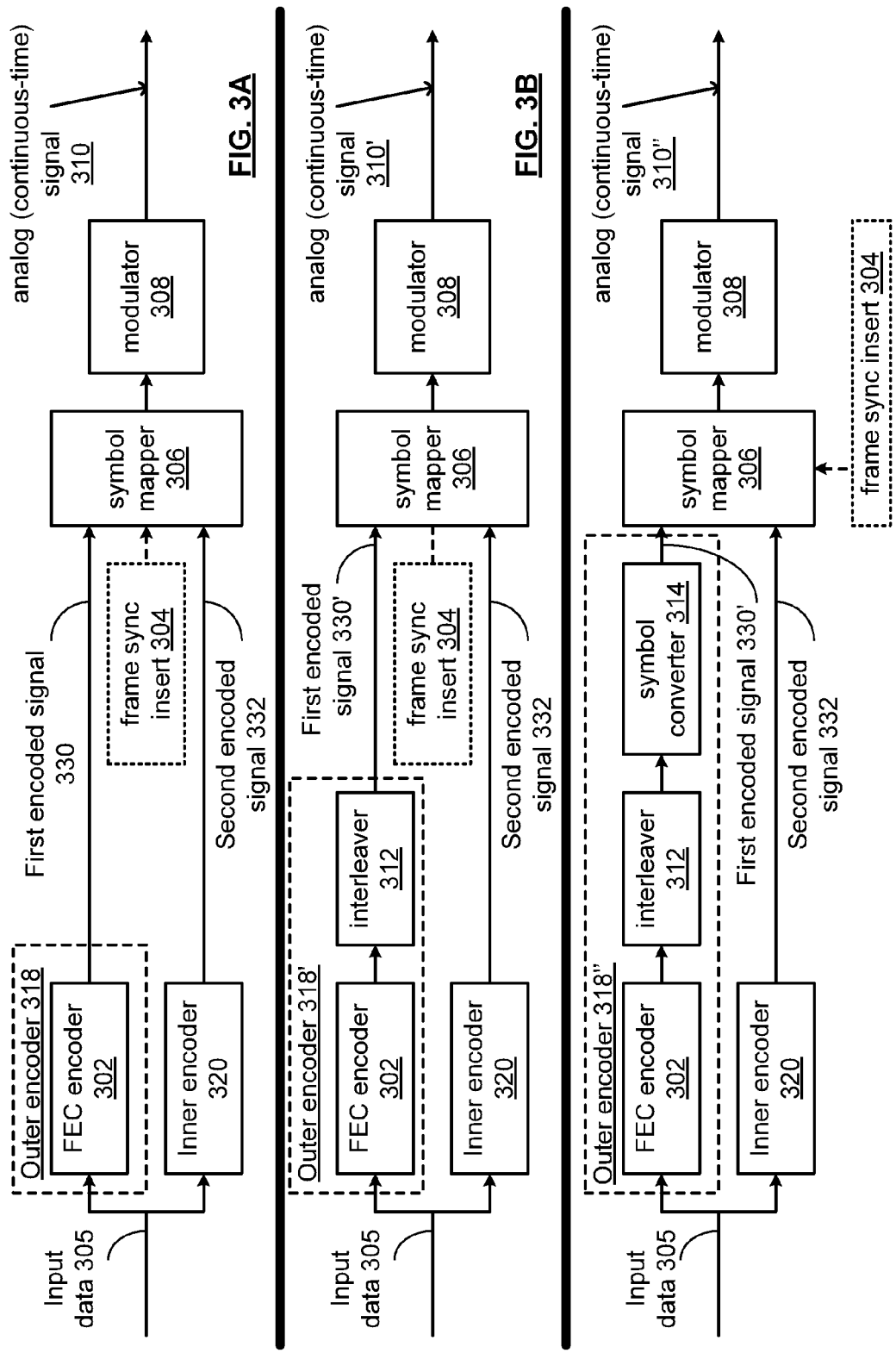

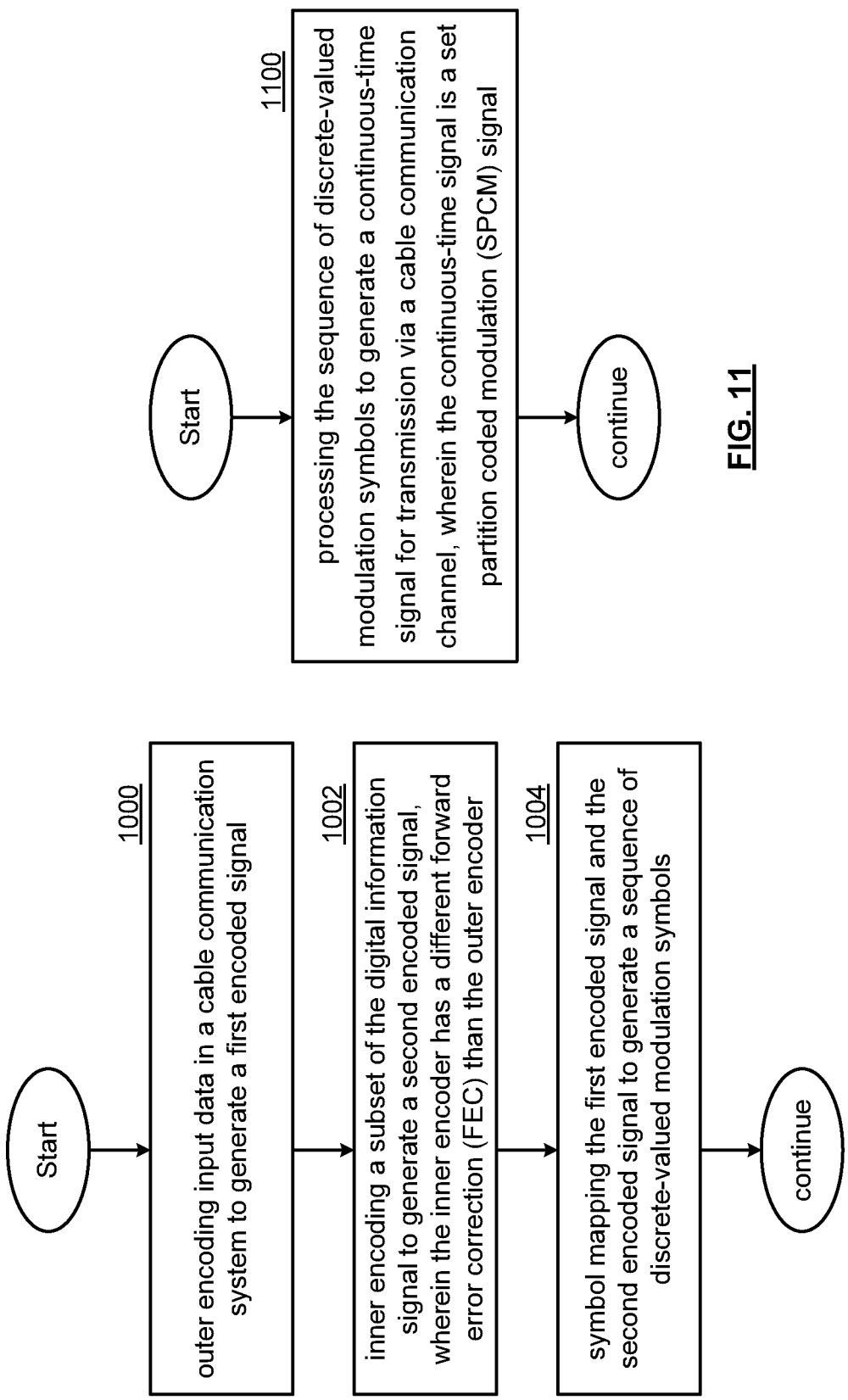

STAGGERED TRANSMISSION AND RECEPTION FOR REDUCING LATENCY AND MEMORY

CROSS REFERENCE TO RELATED PATENT APPLICATIONS

The present U.S. Utility patent application claims priority pursuant to 35 U.S.C. §119(e) to the following U.S. Provisional patent applications which are hereby incorporated herein by reference in their entirety and made part of the present U.S. Utility patent application for all purposes:
1. U.S. Provisional Application Ser. No. 61/665,287, entitled SET-PARTITIONED CODED MODULATION WITH INNER AND OUTER CODING ADAPTABLE FOR BURST NOISE MITIGATION, filed on Jun. 27, 2012;
2. U.S. Provisional Application Ser. No. 61/665,292, entitled CODEWORD DECODING BUFFERING IN MULTI-CHANNEL APPLICATIONS, filed on Jun. 27, 2012;
3. U.S. Provisional Application Ser. No. 61/824,120, entitled INNER AND OUTER DECODING FOR SET-PARTITIONED CODED MODULATION, filed on May 16, 2013.
4. U.S. Provisional Application Ser. No. 61/824,148, entitled SET-PARTITIONED CODED MODULATION WITH INNER AND OUTER CODING, filed on May 16, 2013;

The present application is further related to the following:
1. U.S. patent application Ser. No. 13/848,185, entitled CONCATENATED CODING SCHEME FOR BURST NOISE AND AWGN FOR MULTI-CHANNEL APPLICATIONS, filed on Mar. 21, 2013;
2. U.S. Pat. No. 8,437,406, entitled METHOD AND SYSTEM FOR DIGITAL VIDEO BROADCAST FOR CABLE (DVB-C2); and
3. U.S. patent application Ser. No. 13/916,342, entitled SET-PARTITIONED CODED MODULATION WITH INNER AND OUTER CODING, filed Jun. 12, 2013. the contents of which are incorporated herein for any and all purposes, by reference thereto.

BACKGROUND

1. Technical Field

The present application relates generally to communication systems; and, more particularly, it relates to point-to-multipoint communication systems such as cable modem systems.

2. Description of Related Art

In conventional point-to-multipoint communication systems, a network supports bidirectional data communication between a central entity and multiple customer premises equipment (CPE). Example point-to-multipoint communication systems include cable modem systems, fixed wireless systems, cellular communications systems, and satellite communication systems. In each system, the communication path from the central entity to the CPE is typically referred to as the downstream, while the communication path from the CPE to the central entity is typically referred to as the upstream.

One type of point-to-multipoint system is a cable modem system, which typically includes a headend that is capable of communicating with multiple CPEs, each of which provides cable modem functionality. In a cable modem system, the CPE can be a cable modem, a settop box, or a cable gateway, to provide some examples.

DOCSIS (Data Over Cable Service Interface Specification) refers to a group of specifications published by Cable-Labs that define industry standards for cable headend and cable modem equipment. In part, DOCSIS sets forth requirements and objectives for various aspects of cable modem systems including operations support systems, management, data interfaces, as well as network layer, data link layer, and physical layer transport for data over cable systems. One version of the DOCSIS specification is version 2.0, and includes the DOCSIS Radio Frequency Interface (RFI) Specification SP-RFIv2.0-I03-021218 (hereinafter "DOCSIS RFI Specification").

DOCSIS 2.0 supports the ITU-T J. 83 B (hereinafter "Annex B") standard for downstream physical (PHY) layer transmissions from the headend to cable modems. Advances in communication technology are requiring increasingly more bandwidth, which can lead to deficiencies in channel capacity, especially with respect to these downstream transmissions. For example, even cable plants operating at a frequency of 750 MHz are being challenged with capacity shortages, due to increased demand for video on demand (VOD), high-definition television (HDTV), digital services, and expanding analog channel lineups. Numerous schemes have been proposed to help alleviate bandwidth issues, including analog spectrum reclamation and advanced video coding techniques. A DOCSIS 3.0 specification with channel bonding support has been in use for several years and a DOCSIS 3.1 proposal has been circulated.

BRIEF DESCRIPTION OF THE SEVERAL VIEWS OF THE DRAWINGS

FIG. 2 illustrates an embodiment of a cable network based communication system.

FIGS. 3A-3C illustrate various embodiments of different communication devices used in transmission of a signal.

FIG. 10 illustrates an embodiment of a method as may be performed by a communication device.

FIG. 11 illustrates an embodiment of a method as may be performed by a communication device.

DETAILED DESCRIPTION

Figure 1:
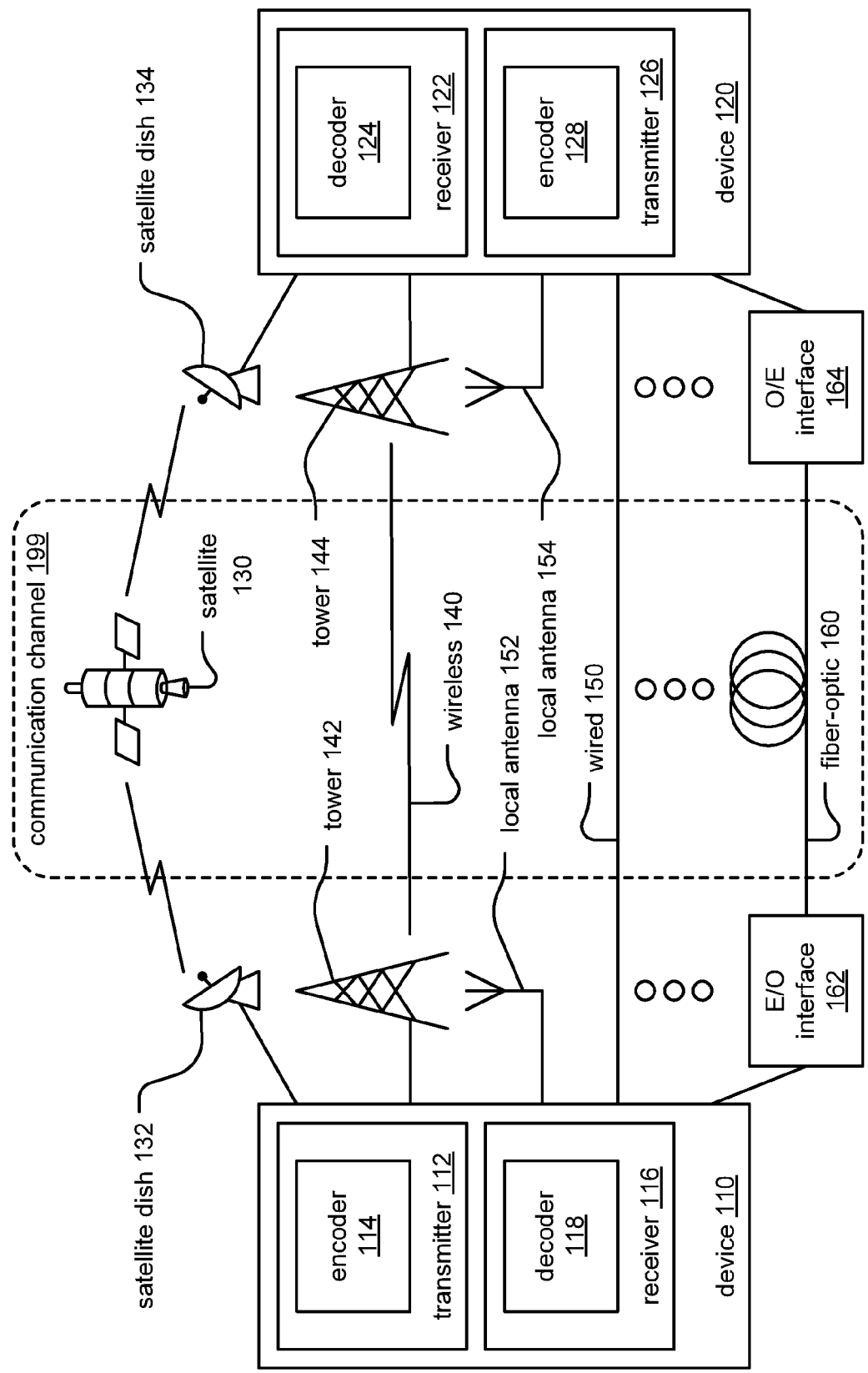
FIG. 1 illustrates an embodiment of a communication system.

FIG. 1 illustrates an embodiment of a communication system. Within such a communication system, signals are transmitted between various communication devices therein. The goal of digital communications systems is to transmit digital data from one location, or subsystem, to another either error free or with an acceptably low error rate. As shown in FIG. 1, data may be transmitted over a communications channel 199 such as magnetic media, wired, wireless, fiber, copper, and/or other channel type.

The communications channel 199 couples a communication device 110 (including a transmitter 112 having an encoder 114 and including a receiver 116 having a decoder 118) situated at one end of the communication channel 199 to another communication device 120 (including a transmitter 126 having an encoder 128 and including a receiver 122 having a decoder 124) at the other end of the communication channel 199. In some embodiments, either of the communication devices 110 and 120 may only include a transmitter or a receiver. There are several different types of media by which the communication channel 199 may be implemented (e.g., a satellite communication channel 130 using satellite dishes 132 and 134, a wireless communication channel 140 using towers 142 and 144 and/or local antennae 152 and 154, a wired communication channel 150, and/or a fiber-optic communication channel 160 using electrical to optical (E/O) interface 162 and optical to electrical (O/E) interface 164)). In addition, more than one type of media may be implemented and interfaced together thereby forming the communication channel 199.

To reduce transmission errors that may undesirably be incurred within a communication system, error correction and channel coding schemes are often employed. Generally, these error correction and channel coding schemes involve the use of an encoder at the transmitter end of the communication channel 199 and a decoder at the receiver end of the communication channel 199. In this embodiment, the error correction includes a set-partitioned coded modulation with inner and outer coding. Any of various types of ECC (error correction coding) codes described can be employed within such inner and outer coding within any such desired communication system (e.g., including those variations described with respect to FIG. 1), any information storage device (e.g., hard disk drives (HDDs), network information storage devices and/or servers, etc.) or any application in which information encoding and/or decoding is desired.

Generally speaking, when considering a communication system in which video data is communicated from one location, or subsystem, to another, video data encoding may generally be viewed as being performed at a transmitting end of the communication channel 199, and video data decoding may generally be viewed as being performed at a receiving end of the communication channel 199.

Also, while the embodiment of this diagram shows bi-directional communication being capable between the communication devices 110 and 120, it is of course noted that, in some embodiments, the communication device 110 may include only video data encoding capability, and the communication device 120 may include only video data decoding capability, or vice versa (e.g., in a uni-directional communication embodiment such as in accordance with a video broadcast embodiment).

It is noted that such communication devices 110 and/or 120 may be stationary or mobile without departing from the scope and spirit of the various embodiments. For example, either one or both of the communication devices 110 and 120 may be implemented in a fixed location or may be a mobile communication device with capability to associate with and/or communicate with more than one network access point (e.g., different respective access points (APs) in the context of a mobile communication system including one or more wireless local area networks (WLANs), different respective satellites in the context of a mobile communication system including one or more satellite, or generally, different respective network access points in the context of a mobile communication system including one or more network access points by which communications may be effectuated with communication devices 110 and/or 120.

FIG. 2 illustrates an embodiment of a cable network based communication system. In particular, a cable system is presented where the communication channel 199 includes one or more cable network segments 298 and 299. Such a cable system may generally be referred to as a cable plant and may be implemented, at least in part, as a hybrid fiber-coaxial (HFC) network (e.g., including various wired and/or optical fiber communication segments, light sources, light or photo detection complements, etc.). For example, the communication system 200 includes a number of cable modems (shown as CM 1, CM 2, and up to CM n). A cable modem network segment 299 couples the cable modems to a cable modem termination system (CMTS) (shown as 240 or 240a and as described below).

A CMTS 240 or 240a is a component that exchanges digital signals with cable modems on the cable modem network segment 299. Each of the cable modems coupled to the cable modem network segment 299, and a number of elements may be included within the cable modem network segment 299. For example, routers, splitters, couplers, relays, and amplifiers may be contained within the cable modem network segment 299.

The cable modem network segment 299 allows communicative coupling between a cable modem (e.g., a user) and the cable headend transmitter 230 and/or CMTS 240 or 240a. Again, in some embodiments, a CMTS 240a is in fact contained within a cable headend transmitter 230. In other embodiments, the CMTS is located externally with respect to the cable headend transmitter 230 (e.g., as shown by CMTS 240). For example, the CMTS 240 may be located externally to the cable headend transmitter 230. In alternative embodiments, a CMTS 240a may be located within the cable headend transmitter 230. The CMTS 240 or 240a may be located at a local office of a cable television company or at another location within a cable system. In the following description, a CMTS 240 is used for illustration; yet, the same functionality and capability as described for the CMTS 240 may equally apply to embodiments that alternatively employ the CMTS 240a. The cable headend transmitter 230 is able to provide a number of services including those of audio, video, local access channels, as well as any other service of cable systems. Each of these services may be provided to the one or more cable modems (e.g., CM 1, CM 2, etc.). In addition, it is noted that the cable headend transmitter 230 may provide any of these various cable services via cable network segment 298 to a set top box (STB) 220, which itself may be coupled to a television 210 (or other video or audio output device). While the STB 220 receives information/services from the cable headend transmitter 230, the STB 220 functionality may also support bi-directional communication, in that, the STB 220 may independently (or in response to a user's request) communicate back to the cable headend transmitter 230 and/or further upstream.

In addition, through the CMTS 240, the cable modems are able to transmit and receive data from the Internet and/or any other network (e.g., a wide area network (WAN), internal network, etc.) to which the CMTS 240 is communicatively coupled. The operation of a CMTS, at the cable-provider's head-end, may be viewed as providing analogous functions provided by a digital subscriber line access multiplexor (DSLAM) within a digital subscriber line (DSL) system. The CMTS 240 takes the traffic coming in from a group of customers on a single channel and routes it to an Internet Service Provider (ISP) for connection to the Internet, as shown via the Internet access. At the head-end, the cable providers will have, or lease space for a third-party ISP to have, servers for accounting and logging, dynamic host configuration protocol (DHCP) for assigning and administering the Internet protocol (IP) addresses of all the cable system's users (e.g., CM 1, CM2, etc.), and typically control servers for a protocol called Data Over Cable Service Interface Specification (DOCSIS), the major standard used by U.S. cable systems in providing Internet access to users. The servers may also be controlled for a protocol called European Data Over Cable Service Interface Specification (EuroDOCSIS), the major standard used by European cable systems in providing Internet access to users, without departing from the scope and spirit of the various embodiments.

The downstream information flows to all of the connected cable modems (e.g., CM 1, CM2, etc.). The individual network connection, within the cable modem network segment 299, decides whether a particular block of data is intended for it or not. On the upstream side, information is sent from the cable modems to the CMTS 240; on this upstream transmission, the users within the group of cable modems to whom the data is not intended do not see that data at all. As an example of the capabilities provided by a CMTS, a CMTS will enable as many as 1,000 users to connect to the Internet through a single 6 Mega-Hertz channel. Since a single channel is capable of 20-40 Mega-bits per second of total throughput (e.g., currently in the DOCSIS standard, but with higher rates envisioned such as those sought after in accordance with the developing DVB-C2 (Digital Video Broadcasting—Second Generation Cable) standard, DVB-T2 (Digital Video Broadcasting—Second Generation Terrestrial) standard, etc.), this means that users may see far better performance than is available with standard dial-up modems.

Moreover, it is noted that the cable network segment 298 and the cable modem network segment 299 may actually be the very same network segment in certain embodiments. In other words, the cable network segment 298 and the cable modem network segment 299 need not be two separate network segments, but they may simply be one single network segment that provides connectivity to both STBs and/or cable modems. In addition, the CMTS 240 or 240a may also be coupled to the cable network segment 298, as the STB 220 may itself include cable modem functionality therein.

It is also noted that any one of the cable modems 1, 2, . . . n, the cable headend transmitter 230, the CMTS 240 or 240a, the television 210, the STB 220, and/or any device existent within the cable network segments 298 or 299, may include a memory optimization module as described herein to assist in the configuration of various modules and operation in accordance with any one of a plurality of protocols therein.

Various communication devices can operate by employing an equalizer therein (e.g., an adaptive equalizer). Some examples of such communication devices include those described herein, including cable modems (CMs). However, it is noted that various aspects and principles presented herein may be generally applied to any type of communication device located within any of a variety of types of communication systems. For example, while some illustrative and exemplary embodiments herein employ the use of a CM in particular, though it is noted that such aspects and principles presented herein may be generally applied to any type of communication device located within any of a variety of types of communication systems.

Various communication devices (e.g., a cable modem (CM), a cable modem termination system (CMTS), etc.) may report information there between and coordinate operation thereof. It is again noted that while the particular illustrative example of a cable modem (CM) is employed in a number of different embodiments, diagrams, etc. herein, such architectures, functionality, and/or operations may generally be included and/or performed within any of a number of various types of communication devices including those operative in accordance with the various communication system types, including those having more than one communication medium type therein, such as described with reference to FIG. 1.

Generally speaking, certain communication devices may be implemented to receive signals from or provide signals to communication networks or communication systems having more than one respective communication channel. In addition, in certain situations, a given communication channel may be subdivided respectfully into a number of communication channels (e.g., either different respective communication channels, such as different respective frequency bands within a given communication channel, or even within different respective logical communication channels).

Herein, various aspects, embodiments, and/or their equivalents, may be adapted and employed for various uses within communication systems including modernizing DOCSIS downstream physical layer (PHY) is presented. For example, in one embodiment, set partition coded modulation (SPCM) may be employed using two or more respective forward error correction codes (FECs) and/or error correction codes (ECCs) including an inner and outer coding of transmitted data.

FIGS. 3A-3C illustrate various embodiments of different communication devices used in transmission of a signal. In particular, a transmission portion of a communication device, such as devices 110, 120 STB 220, CMTS 240, CMTS 240a, CM 1, 2, . . . n or other communication device is shown. The components of these devices can be implemented via a processing module such as a baseband processing module or other circuitry. In FIG. 3A input data 305 is converted into an analog continuous time signal 310 for transmission. The input data 305 is separated (split) into inputs to an outer encoder 318 and an inner encoder 320. Outer encoder 318 encodes a subset of the input data 305 via FEC (forward error correction) encoder 302 to generate a first encoded signal 330. Inner encoder 320 encodes a subset of the input data to generate a second encoded signal 332, wherein the inner encoder 320 has a (possibly) different FEC than the outer encoder 318. A symbol mapper 306 processes the first encoded signal 330 and the second encoded signal 332 to generate a sequence of discrete-valued modulation symbols, and optionally inserts frame synchronization information into the sequence of discrete-valued modulation symbols via frame sync insert 304. A modulator 308 processes the sequence of discrete-valued modulation symbols to generate the analog continuous-time signal 310 for transmission via a communication channel. This analog continuous-time signal 310 may be viewed as an analog signal, compliant with an appropriate for communication via one or more communication channels (e.g., such as any one or more communication channel types including those described with reference to FIG. 1 or 2).

The apparatus of FIG. 3B operates in a similar fashion to the apparatus of FIG. 3A to generate an analog continuous time signal 310', except that the first encoded signal 330' is generated by interleaver 312 by interleaving the FEC encoded signal from FEC encoder 302. In an embodiment, the interleaver may operate as a convolutional interleaver (e.g., a Ramsey II type convolutional interleaver), a block interleaver, and/or any other type of interleaver as may be desired with respect to various embodiments.

The apparatus of FIG. 3C operates in a similar fashion to the apparatus of FIG. 3C to generate an analog continuous time signal 310", except that the first encoded signal 330" is generated by symbol converter from an interleaved encoded signal from interleaver 312.

The respective modules that make up the devices in FIGS. 3A, 3B and 3C including outer encoders, 318, 318' and 318", inners encoder 320, frame sync insert 304, symbol mapper 306 and modulator 308 can each be implemented via a circuit, such as a processing module and memory or other circuit.

With respect to each of these various embodiments depicted within this diagram, it is noted different respective encoding schemes may be employed by the inner encoder 320 and outer encoder 318. That is to say, the two respective codes need not necessarily be the same, and each may be different in terms of a number of different considerations including complexity, redundancy, error correction capability, type, code rate, and/or any other one or more characteristics).

Moreover, it is noted that the respective number of bits provided from each respective encoder need not necessarily be the same. For example, symbols having a first number of bits may be provided from the first encoder while symbols having a second number of bits may be provided from the second encoder. Alternatively, codewords having a first size may be provided from the first encoder while codewords having a second size may be provided from second code. It is of course noted that while two respective encoders are shown with respect to these diagrams, alternative embodiments may also include more respective encoders (for example three, or more) that each respectively generate encoded signals (e.g., that may include respective symbols, codewords, and/or other coded signal portions). Moreover, any of these embodiments or others may operate to include one or more uncoded bits in accordance with generating the sequence of discrete-valued modulation symbols such as may be performed by the symbol mapper.

With respect to the number of bits within respective symbols, codewords, etc. provided from the respective outer encoder 318, 318' or 318" and inner encoder 320, it is noted that such operation may be dynamic and adaptive in certain by. For example, considering one possible implementation, at or during a first time, symbols may be provided from the outer encoder 318, 318' or 318" having a first number of bits, and symbols may be provided from the inner encoder 320 having a second number of bits. Then, at or during a second time, symbols may be provided from the inner encoder 320 having a third number of bits, and symbols may be provided from the outer encoder 318, 318' or 318" having a fourth number of bits.

In certain embodiments, the total number of bits included within symbols provided from both the inner encoder 320 and the outer encoder 318, 318' or 318" may be fixed, yet the partitioning of those bits may be variable. For example, considering one possible implementation in which the total number of bits within symbols provided from the inner encoder 320 as well as from the outer encoder 318, 318' or 318" includes X number of bits, then at or during a first time, symbols may be provided from the inner encoder 320 having X-Y number of bits, and symbols may be provided from the outer encoder 318, 318' or 318" having Y number of bits. As may be seen, the total number of bits provided from both the inner encoder 320 and the outer encoder 318, 318' or 318" includes X number of bits. Then, at or during a second time, symbols may be provided from the inner encoder 320 having X-Z number of bits, and symbols may be provided from the outer encoder 318, 318' or 318" having Z number of bits. Again, as may be seen, the total number of bits provided from both the first encoder and the second encoder includes X number of bits. Such dynamic operation in terms of scaling the respective number of bits within symbols provided from each of the respective encoders may be adaptive based upon any one or more considerations (e.g., one or more local operating conditions, one or more communication channel conditions, one or more remote operating conditions, and/or any other consideration).

The operation of the various embodiments, including several optional functions and features, can be described in conjunction with the examples that follow. In one example of operation, the analog continuous-time signal 310, 310' and/or 310" can be a set partitioned coded modulation (SPCM) signal. In particular, the inner encoder 320 can encode a subset of the input data corresponding to a plurality of least significant bits of the input data. Further, the symbol mapper 306 processes the first encoded signal 330, 330' or 330" as a plurality of most significant bits and the second encoded signal 332 as a plurality of least significant bits to generate a sequence of discrete-valued modulation symbols. In addition, the outer encoder 318 can block encode the input data in blocks of a first length to generate the first encoded signal 330, 330' or 330" and the inner encoder can block encode a subset of most significant bits of the input data in blocks of a second length to generate the second encoded signal 332. The block lengths of the FEC coding used can be of different lengths corresponding to different coding gains, different FEC schemes, etc.

In a further example of operation, SPCM may be employed with low density parity check (LDPC) inner coding and a Reed-Solomon outer coding, each coding generating a corresponding subset of bits within symbols, codewords, etc. In particular, the symbol mapper 306 generates symbols with high density constellations such as 256QAM, 1024QAM, 4096QAM, etc.

Figure 4:
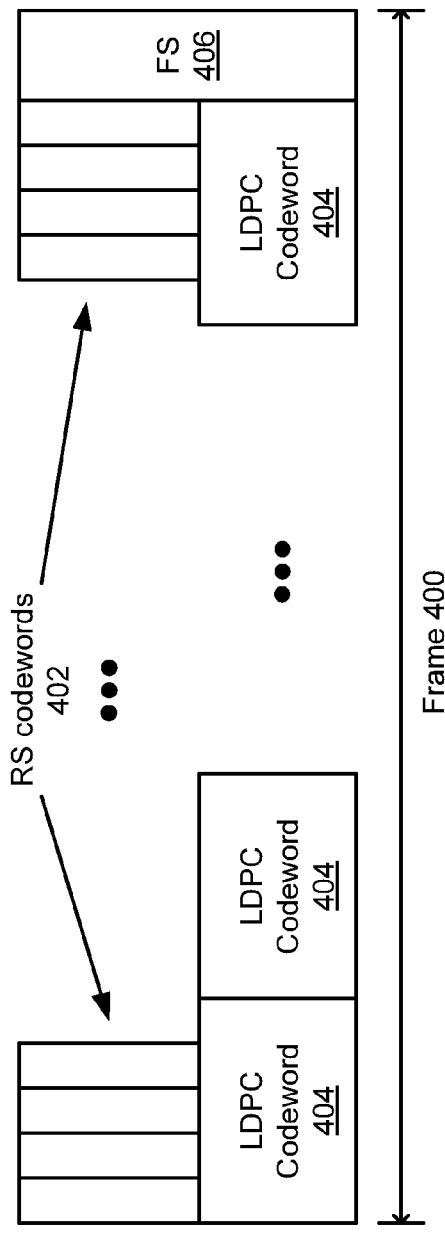
FIG. 4 illustrates an embodiment of a communication device used in receiving a signal.

FIG. 4 illustrates an embodiment of a frame. An exemplary frame 400 is shown that carries both RS (Reed Solomon) codewords 402 and LDPC codewords 404. In particular, a frame 400 communicated by a communication device, such as devices 110, 120, STB 220, CMTS 240, CMTS 240*a*, CM 1, 2, . . . n or other communication device, is shown. The framing shown within this diagram, which corresponds to the implementation of the communication device of the previous diagram provides for framing for quadrature amplitude modulation (QAM) and also provides for a 2.16 millisecond frame. As may be understood by the reader, such characteristics are similar to current DOCSIS. However, as may be understood with respect to this diagram, there are a number of LDPC codewords per frame. If desired, a particular number of QAM symbols may be employed for a frame synchronization trailer 406 (e.g., 56 QAM symbols for frame sync trailer).

For example, 1024QAM can be implemented with a frame 400 using 5×2300 QAM symbols of 10 bits per symbol, plus frame sync QAM symbols, and will provide for (a) 5 codewords of the 4600 bit LDPC code (2 of each 10 bits per QAM symbol come from the LDPC inner code), and (b) 23 codewords of the Reed-Solomon code using RS(400, 372) as an example (where 5 QAM symbols carry 8 bits per QAM symbol from a RS codeword, corresponding to 40 bits, at 10 bits each from 4 RS code symbols from Galois Field 1024). Here the 400 RS symbols from one codeword are carried by the 8 MSBs of 500 QAM symbols. It is noted that there is Ramsey Type II convolutional interleaving, (5,80), for the RS symbols.

Other frame configurations are possible. For 4096 QAM, for example, another frame 400 using 4×2300 QAM symbols of 12 bits per symbol, plus frame sync QAM symbols, will provide for (a) 4 codewords of the 4600 bit LDPC code (2 of each 12 bits per QAM symbol come from the LDPC inner code), and (b) 23 codewords of the Reed-Solomon code using RS(400, 372) as an example (where each QAM symbol carries 10 bits of RS data per QAM symbol, each a full 10 bit RS symbol from Galois Field 1024). Here, the 400 RS symbols from one codeword are carried by the 10 MSBs of 400 QAM symbols. It is noted that there is Ramsey Type II convolutional interleaving, (5,80), for the RS symbols. In both 4096 QAM and 1024 QAM the interleaving spreads the impacted symbols of envisioned burst events over 5 different RS codewords.

For 256 QAM, for example, a frame 400 using 6×2300 QAM symbols of 8 bits per symbol, plus frame sync QAM symbols, will provide for (a) 6 codewords of the 4600 bit LDPC code (2 of each 8 bits per QAM symbol come from the LDPC inner code), and (b) 23 codewords of the Reed-Solomon code using RS(360, 335) as an example (where 5 QAM symbols carry 6 bits per QAM symbol from a RS codeword, corresponding to 30 bits, at 10 bits each from 3 RS code symbols from Galois Field 1024). Here the 360 RS symbols from one codeword are carried by the 6 MSBs of 600 QAM symbols. It is noted that there is Ramsey Type II convolutional interleaving, (4,90), for the RS symbols for this embodiment. Since the RS symbols are spread over more QAM symbols, the interleaving depth of the interleaver can be less than with the higher order modulations, and the amount of erasure and correction capability of each RS codeword (related to the number of parity RS symbols in each codeword) can be reduced compared to application with the higher order QAM modulations, for the same burst event duration mitigation and the same QAM symbol rate. In this application, 64 impacted RS symbols are spread over 4 different RS codewords by the interleaver. The system solution encompassing encoding (decoding at the receiver), interleaving (deinterleaving at the receiver), framing (frame synchronization at the receiver), and mapping system described provides a beneficial combination of targeted, selected flexibility accommodating different modulation densities (to match a variety of systems conditions) while also providing powerful and robust coding and impairment mitigation techniques. For example outer coding (Reed-Solomon encoding in examples above) parameters are flexible to an extent, interleaving parameters are flexible within an extent, the number of bits in the symbol mapper from the encoders may be partitioned differently, and the frame duration is flexible within an extent, providing a powerful yet efficient, minimally complex overall system which may adapt modulation constellation density over a wide range and yet maintain important synergy, and robustness, across all operating modes.

Note that if the codeword length of the LDPC inner code is chosen differently than 4600 bits, the size of the RS codes, since they are shortened considerably already, may be adjusted to provide for a similar duration frame length as with the examples above, with integer number of RS codewords and LDPC codewords in a frame. Other frame durations are feasible, but a frame duration of approximately 2 milliseconds with approximately (neighborhood) 50 QAM symbols for frame sync header (or trailer 406) provides high efficiency (low amount of frame sync QAM symbols compared to data symbols in the frame), and for a reasonable number of bits for accomplishing frame synchronization with bits left over for signaling (as in ITU-T J.83B as an example), while also providing a frame duration which is not oppressively long (to allow quick synchronization, for example).

Since with each example modulation density frame, the framing consists of a continuous sequence of LDPC codewords (with brief interruption by frame sync header), even though the number of LDPC codewords per frame is different for different modulation densities, the staggered alignment of the LDPC codewords (for minimizing buffering when sharing a single LDPC decoder across multiple channels—as will be discussed further in conjunction with FIGS. 4 and 8) is facilitated even when channels sharing the LDPC decoder in a receiver have different modulation densities.

For 1024QAM, for example, a frame 400 using 5×2300 QAM symbols of 10 bits per symbol, plus frame sync QAM symbols, will provide for (a) 5 codewords of the 4600 bit LDPC code (2 of each 10 bits per QAM symbol come from the LDPC inner code), and (b) 10 codewords of the Reed-Solomon code using RS(920, 870) as an example (where 5 QAM symbols carry 8 bits per QAM symbol from a RS codeword, corresponding to 40 bits, at 10 bits each from 4 RS code symbols from Galois Field 1024). Here the 920 RS symbols from one codeword are carried by the 8 MSBs of 1150 QAM symbols. There is Ramsey Type II convolutional interleaving, (2,460), for the RS symbols. The interleaving spreads the impacted symbols over 2 different RS codewords. This approach with the longer RS codeword (shortened less than the first embodiments described above) require less interleaving depth and provide higher code rate (and thus higher spectral efficiency in terms of bps/Hz) for a given burst event duration mitigation.

Similar advantages can be obtained with other modulation densities, while maintaining the general frame duration and other characteristics of the embodiments above.

It should be noted that using the inner coding on more than 2 bits (e.g., 4 LSBs) provides benefits and for some complexity and error performance target applications may be a preferred embodiment. Three additional examples follow, one each for 256QAM, 1024QAM, and 4096QAM, using the longer RS codewords.

With 256QAM, use a Reed-Solomon codeword (920, 880), and this provides 1150 QAM symbols per RS codeword, and thus 10 such RS codewords in a frame 400 (with 6 LDPC (4600, 3900) codewords).

With 1024QAM, use a Reed-Solomon codeword (920, 870), and this provides 1150 QAM symbols per RS codeword, and 12 such RS codewords in a frame 400 (with 6 LDPC (4600, 3900) codewords); this is a longer frame size than with the RS(920,870) for 1024QAM given at the bottom below, by 6/5 (since there are 6 LDPC codewords per frame instead of 5).

With 4096QAM, an envisioned embodiment uses a Reed-Solomon codeword (920, 860), and this provides 920 QAM symbols per RS codeword, and thus 15 such RS codewords in a frame 400 (with 6 LDPC (4600, 3900) codewords).

With this approach the frame size is the same duration, with the same number of QAM symbols, for each modulation density. This makes it even easier to provide the staggering of the LDPC codewords to reduce buffer requirements when sharing a single LDPC decoder among multiple channels. If more or less burst mitigation protection is needed in the outer code, or more or less AWGN protection in the outer code, the number of information symbols in the RS codewords can be decreased or increased, changing the output information rate (bps), but leaving the framing unchanged. This applies to all the modes described herein, as well. The flexible system solution described provides a beneficial combination of flexibility accommodating different modulation densities and different FEC code rates to adjust for more or less burst event duration, as well as differences in AWGN SNR, providing a powerful yet efficient, minimally complex overall system which may adapt modulation constellation density and bits per second and burst mitigation capability over a wide range and yet maintain important synergy across all operating modes.

As may be understood with respect to the various embodiments of set partitioned coded modulation (SPCM) herein, SPCM may be employed using a first type of coding (e.g., LDPC code) on a first subset of bits within symbols or codewords (e.g., 2 LSBs), while a second type of coding (e.g., RS code) may be employed on a second subset of bits within symbols are code words (e.g., 8 respective MSBs). Note that the partitioning may be 4 LSBs and 6 MSBs, with 10 bits per modulation symbol, to name another envisioned partitioning; 6 LSB partitioning is also envisioned. Partitioning into three or more sets of bits per symbol is also envisioned. Partitioning depends in part on channel characteristics such as time-varying SNR (more modestly varying than the more dramatic burst events envisioned) and complexity of potential decoding algorithms for the various inner and outer codes. For example, a highly complex inner decoder may suggest consideration of fewer LSBs for the inner decoder, while a more competent decoding algorithm for the outer decoder may suggest more MSBs. Trading the complexity of the decoders and the rates at which they have to operate (more bits per QAM symbol means higher rates for any of the decoders), and the performance they provide, determines the partitioning which is best for a given application. The combination of the first subset of bits and the second subset of bits may form the total number of bits (e.g., 10 bits in a particular embodiment in which LDPC code is employed on the 2 LSBs and RS code is employed on the 8 MSBs) within the discrete-valued modulation symbols (e.g., which may include 10 bits in one desired embodiment).

As may be understood herein, employing different respective codes having different respective characteristics (e.g., performance, complexity, error correction capability, etc.), a relatively greater error correction capability within one of the codes may be used with a relatively small amount of increasing complexity. In particular, a higher performance code with higher complexity and error correction capability can be applied to a limited partition of the encoded bits—those bits, for example, which could experience more errors. Using this high performance coding on only a subset of bits can increase the code rate compared to the use of a more limited code, while providing a lower complexity when compared with using of the high performance code for all bits.

For example, considering again the embodiment in which LDPC code is employed on the 2 LSBs and RS code is employed on the 8 MSBs, a relative increasing complexity of only approximately ⅕ is introduced by the use of the LDPC code. Again, as has been described elsewhere herein, the respective numbers of bits to which the different respective codes are applied and operate may be dynamic, adaptive, etc. such that the respective numbers of bits may be scaled up and down respectively. In addition, there may be other respective codes (e.g., other respective LDPC codes) which may be selected to provide even greater coding gain on a particular subset of the bits (e.g., the LSBs).

In addition to the adaptive and dynamic characteristics described with respect to scaling the respective numbers of bits associated with each of the respective codes within a given device, it is also noted that different respective codes may be employed by anyone of the respective encoders and/or decoders. That is to say, adaptively and dynamically, a given encoder type device (e.g., such as a multi-code capable device) may select among and between different respective codes at different respective times such that certain of the respective codes may have relatively different characteristics (e.g., error correction capability, complexity, and/or any other characteristics described herein or their equivalents, etc.).

Figure 5:
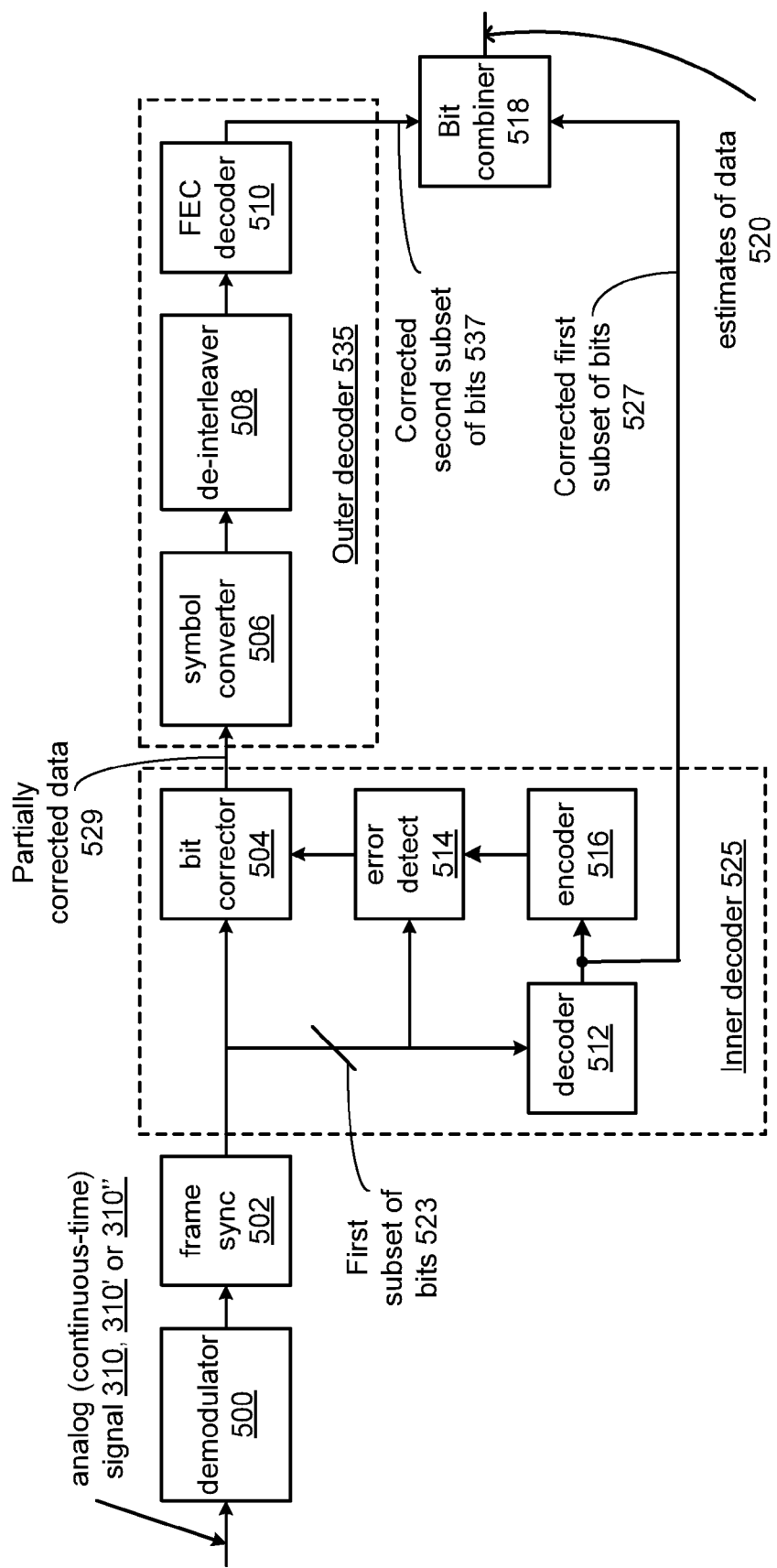
FIG. 5 illustrates an embodiment of a frame.

FIG. 5 illustrates an embodiment of a communication device used in receiving a signal. In particular, a receive portion of a communication device, such as devices 110, 120 STB 220, CMTS 240, CMTS 240a, CM 1, 2, . . . n or other communication device is shown. The components of this device can be implemented via a processing module such as a baseband processing module or other circuitry.

Various embodiments are described in conjunction with the examples that follow, including several optional functions and features. As may be seen with respect to this diagram, demodulator 500 can be operative to process a continuous-time signal 310, 310' or 310" (e.g., such as an analog signal received from a channel 199) to generate one or more discrete-valued modulation symbols (e.g., a sequence of discrete-valued modulation symbols). In certain embodiments, frame synchronization operations may be performed on the output from the demodulator via frame sync module 502, such as with respect to those implementations in which the received signal includes frame synchronization information. An decoder 512 of inner decoder 525 operates to decode certain of the bits of the discrete-valued modulation symbols to generate a first estimate in the form of corrected first subset of bits 527 (e.g., of at least one bit). This estimate may undergo re-encoding via encoder 516 for comparison via error detect module 514 and error correction via bit corrector 504 to correct corresponding bits of the original stream, if necessary, before this stream undergoes decoding by outer decoder 535 to generate a second estimate in the form of corrected second subset of bits 537 (e.g., of at least one other bit). The respective estimates generated by the inner decoder 525 and outer decoder 535 undergo combination via bit combiner 518 to generate estimates of the data 520—the digital information signal that originally underwent encoding within a corresponding encoder type device.

Generally speaking, as may be understood with respect to other embodiments enter diagrams described herein, in which more than one respective encoder operate to generate different respective encoded signals, within such a decoder/receiver type communication device, a corresponding number of respective decoders also operate to generate estimates of different respective portions of a received signal. For example, a first decoder may operate to generate estimates of a first subset of bits within the respective discrete-valued modulation symbols, and a second decoder may operate to generate estimates of a second subset of bits within the respective discrete-valued modulation symbols. Working in combination, these two respective decoders may operate in accordance with set partitioned coded modulation (SPCM) to perform decoding of a received signal to generate estimates of the data or digital information signal that originally underwent encoding within a corresponding encoder type device.

In one example of operation, the demodulator 500 processes a continuous-time signal, such as analog continuous-time signal 310, 310' or 310" or other signal, to generate at a plurality of encoded bits that are frame synchronized via frame sync 502 to a frame, such as frame 400 or other frame. The inner decoder 525 processes a first subset of bits 523 within the plurality of encoded bits to correct selected ones of the first subset of bits 523 to form a corrected first subset of bits 527 and to generate partially corrected data 529 from the plurality of encoded bits based on the corrected first subset of bits 527. As will be discussed further in conjunction with FIGS. 8-9, the plurality of encoded bits are generated from one of a plurality of different data channels, such as a plurality of DOCSIS single carrier channels or other parallel bit streams. A low density parity check (LDPC) decoder included in inner decoder 525 can be a shared device that generates the corrected first subset of bits 527 for the plurality of different data channels.

In an embodiment, the plurality of encoded bits are generated from a plurality of symbols, the plurality of symbols having n bits per symbol. The first subset of bits 523 correspond to a plurality of most significant bits of the n bits per symbol. The inner decoder 525 includes a decoder 512 such as a low density parity check (LDPC) decoder or other FEC decoder that generates the corrected first subset of bits 527. The encoder 516, such as a low density parity check (LDPC) encoder or other FEC encoder, re-encodes the corrected first subset of bits 527 to form a re-encoded first subset of bits. The error detector 514 generates an error detection signal by comparing the re-encoded first subset of bits to the first subset of bits 527 to identify those bits in the first subset of bits that need to be corrected. The bit corrector 504 generates the partially corrected data 529 based on the error detection signal—in this example, by correcting selected ones of the plurality of most significant bits of the n bits per symbol.

The outer decoder 535, such as a Reed-Solomon (RS) decoder or other FEC decoder, processes the partially decoded data 529, to correct selected ones of a second subset of the plurality of encoded bits to form a corrected second subset of bits 537. Following with the example discussed above where the first subset of bits 523 correspond to a plurality of most significant bits of the n bits per symbol, the second subset of the plurality of encoded bits correspond to a plurality of least significant bits of the n bits per symbol. The bit combiner 518 generates data estimates 520 by combining the corrected first subset of bits 527 and the corrected second subset of bits 529.

As shown, the outer decoder optionally includes a deinterleaver 508 and symbol converter 506, that optionally symbol convert and de-interleave the partially corrected data 529, prior to decoding. In particular when a corresponding interleaver and symbol conversion module has been included within and encoder/transmitter type device, a corresponding deinterleaver and symbol conversion module may be included within a decoder/receiver type device. As may be understood, the implementation of a de-interleaver and symbol conversion module is operative to accommodate the corresponding processing performed by an interleaver and a symbol conversion module within the encoder/transmitter type device.

With respect to the various embodiments included herein that perform encoding and/or decoding, it is noted that not all respective coded bits need undergo interleaving. For example, in certain embodiments, interleaving is performed only with respect to a subset of bits generated by one or more of the respective encoders. Of course, correspondingly, as needed, appropriate de-interleaving may be performed within a given decoder/receiver type device when corresponding interleaving is performed within a given encoder/transmitter type device. The particular encoded bits that undergo interleaving may be one or more of the least significant bits, one or more of the most significant bits, and/or any desired selected one or more bits within symbols, discrete-valued modulation symbols, codewords, etc.

For example, in certain embodiments, interleaving soft bit information may not necessarily be preferred. Soft bits increase the amount of memory required for deinterleaving, and thus avoiding interleaving when the corresponding receiver decoder will require soft bits is desirable in general.

That is to say, in some situations, soft bits may be handled in a particular way to acquire the greatest coding gain possible. Such soft bits need not necessarily undergo interleaving, but may use a relatively more powerful code to provide a relatively greater coding gain. For example, a system employing an inner and outer coding where burst mitigation and AWGN SNR performance are optimized with a minimal complexity at the receiver is achievable as described herein with an inner code having a relatively greater error correction capability (e.g., such as LDPC code in comparison to, perhaps, Reed-Solomon (RS) code) and an outer code such that interleaving may be performed in combination with coding yet providing relatively less powerful error correction capability (e.g., RS), where interleaving need not necessarily be performed in accordance with the relatively more powerful error correction capability code (e.g., LDPC).

Figure 6:
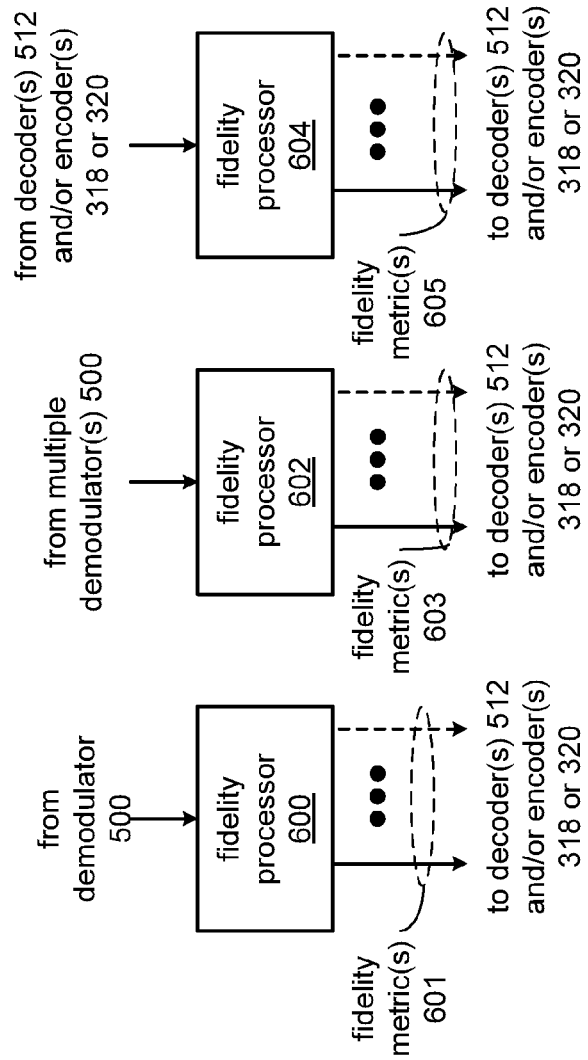
FIG. 6 illustrates another embodiment of a fidelity processor as may be implemented within or operative with a communication device.

FIG. 6 illustrates another embodiment of a fidelity processor as may be implemented within or operative with a communication device. As may be seen with respect to this diagram, one or more fidelity processors 600, 602 or 604 may be employed to operate based upon any combination of inputs and/or outputs. These devices can be implemented via a processing module such as a baseband processing module or other circuitry.

For example, such a fidelity processor 600, 602 or 604 which may be implemented within a decoder/receiver type device, may be operative to generate a channel fidelity estimate via fidelity metrics 601, 603 or 605 that indicate the fidelity of the channel 199 via modulation error rates, noise estimates, bit error rates, frame error rates, symbol error rates or other channel metrics. Such implementation of a fidelity processor 600, 602 or 604 operating to generate a channel fidelity estimate may be operative on output provided from a demodulator, such as demodulator 500, corresponding to the output of one or more channels. In other such embodiments, output from a number of respective channels and/or output from a number of respective demodulators may be employed by the fidelity processor 600, 602 or 604 to generate the channel fidelity estimate. Anyone other embodiments, output from one or more decoders 512, encoders 318 or 320, error detection modules 514, and/or other components may be employed by the fidelity processor 600, 602 or 604 to generate the channel fidelity estimate.

Generally speaking, the use of such a channel fidelity estimate may be employed to improve processing as performed within the decoder/receiver type device. For example, such a channel fidelity estimate may be employed to improve the likelihood ratios (e.g., log-likelihood ratios (LLRs), soft estimates, etc.) as utilized by one or more of the respective decoders within the device (e.g., energy coder, outer decoder, etc.). In certain embodiments, the output from one of the decoders (e.g., inner decoder 525) operates on the least significant bits (e.g., such as may be performed by a LDPC decoder). The resultants provided from such a one of the decoders (e.g., decoder 512, such as an LDPC decoder) may be employed by another of the decoders (e.g., decoder 510, such as an RS decoder) to improve the likelihood ratios (e.g., log-likelihood ratios (LLRs), soft estimates, etc.) and to improve performance based upon any of a number of considerations such as compensating for and/or identifying erasures.

Figure 7:
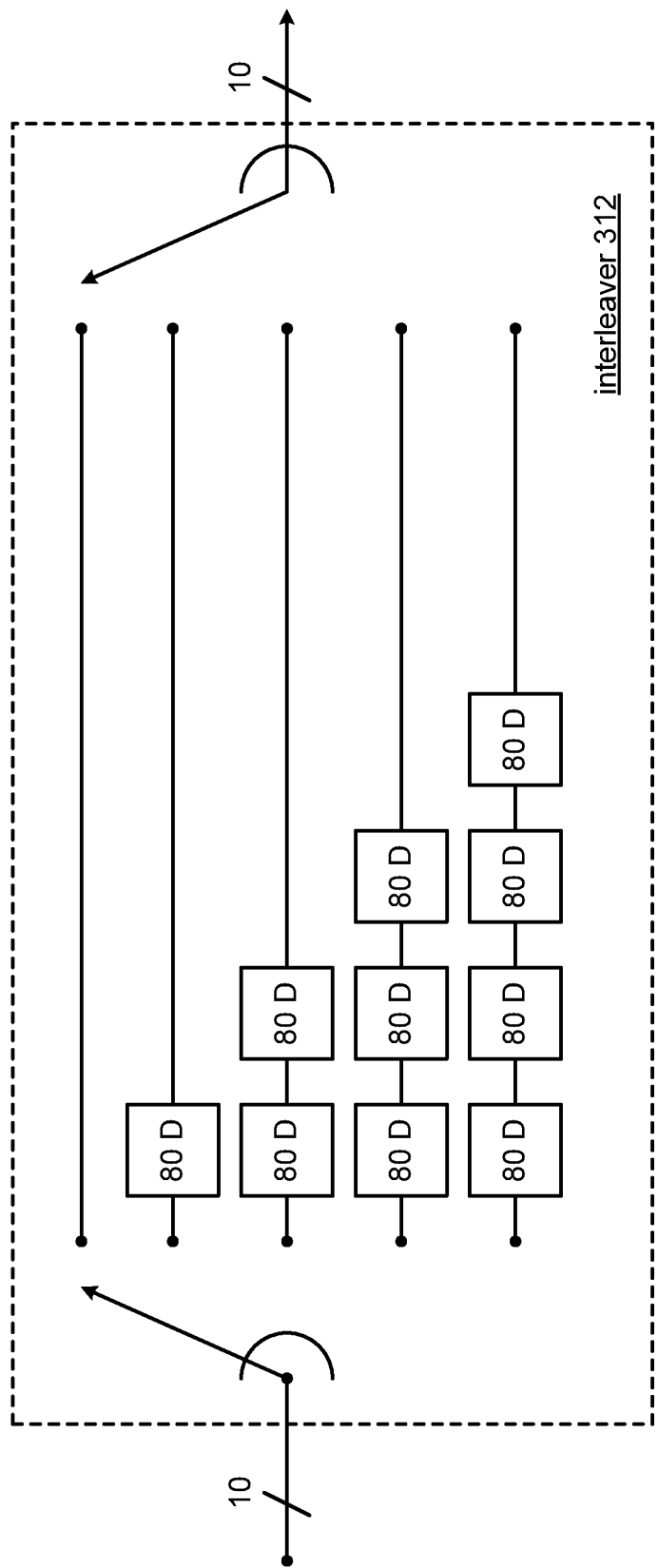
FIG. 7 illustrates an embodiment of a convolutional interleaver.

FIG. 7 illustrates an embodiment of a convolutional interleaver. FIG. 13 illustrates an embodiment of a convolutional interleaver. In particular, this convolution interleaver is an embodiment of interleaver 312 discussed in conjunction with FIGS. 3B and 3C.

The use of such a convolutional interleaver may be viewed as being relatively similar to current DOCSIS (i.e., ITU-T J.83B) but with different dimensions (e.g., for RS outer code). In addition, the operation of such a convolutional interleaver may be achieved using an order of magnitude less memory elements than J.83B (e.g., 8K versus 800). In operation, 10 bit input codewords are interleaved via delay lines of various lengths to produce 10 bit interleaved output codewords. The operation of such a convolutional interleaver may provide for mitigation of 20 microsecond burst events (with event detection for erasures) in combination with 90%+ shortened RS outer code over GF1024). This architecture utilizes the different strengths versus complexity of the two different types of FEC codes to minimize the amount of interleaver size required, in both the transmitter and receiver, but especially in the receiver where the soft bits for the LSB decoder, critical for getting the best performance, are not passed through an interleaver or de-interleaver, while the Reed-Solomon decoder typically uses erasure decoding (if that) and as such requires only a single soft-bit for marking Reed-Solomon symbols for erasure (or not). More soft-bits for the Reed-Solomon decoder could be employed if an ordering of priority for erasure (or not) is generated for various Reed-Solomon symbols, for a decoding algorithm where multiple decoding attempts are provided with increasing numbers of erasures at each attempt. In alternative embodiments the outer code may be an LDPC code, but a shorter code than the inner LDPC code, and with a decoder complexity that is significantly less than required by the inner LDPC code (where the inner code and decoder are operating on the LSBs which require substantially more coding gain than the MSBs). The outer code (and decoder) performance is not needed to be as near to Shannon capacity limits as with the inner code nor is the outer decoder needed to be as near to optimal decoder performance as with the inner code decoding. Since the bulk of the bits are processed through the outer code and decoder, substantial overall complexity savings are realized by focusing the most powerful code and decoding algorithms on the relatively few LSBs instead of on all the bits.

Figure 8:
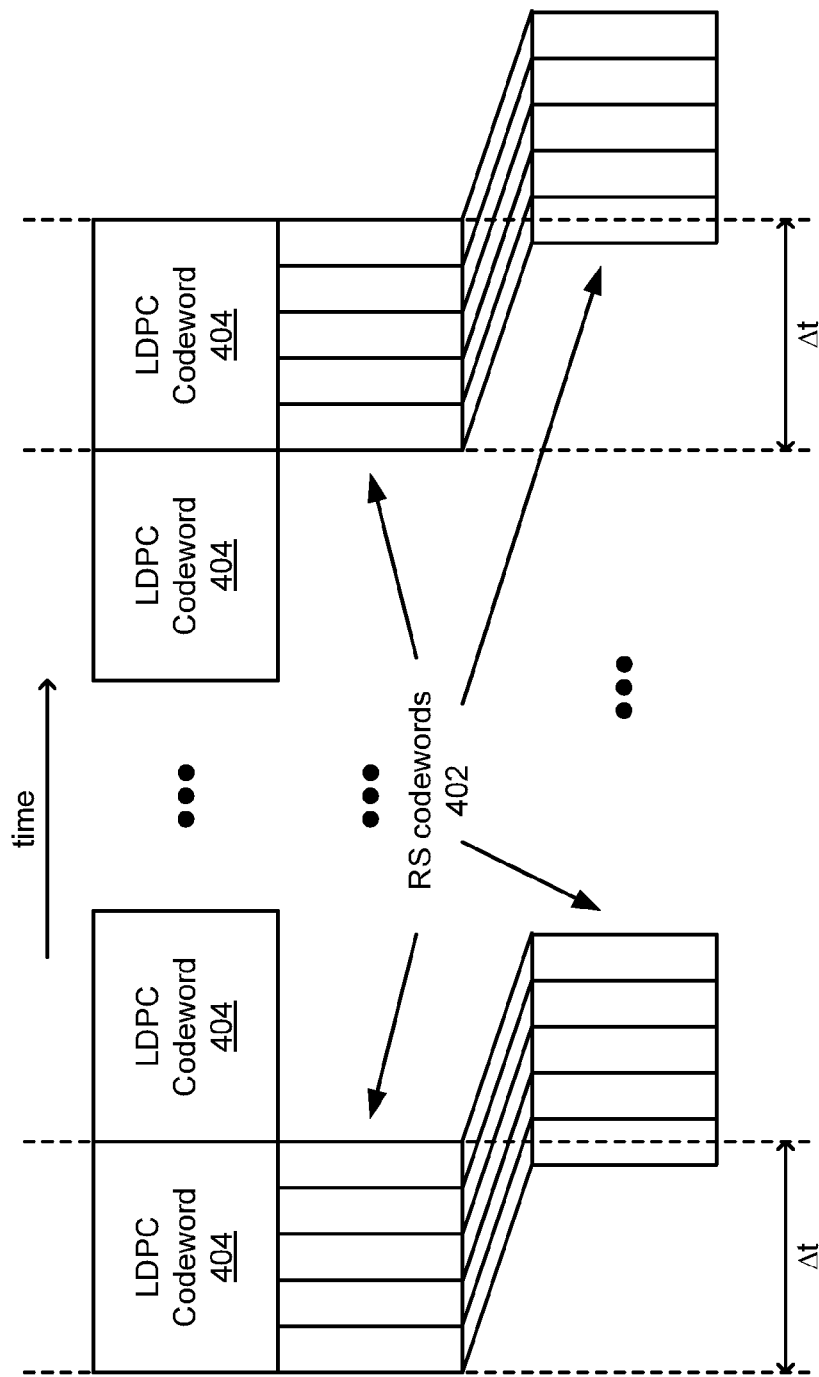
FIG. 8 illustrates an embodiment of decoding functionality as may be performed by a communication device.

FIG. 8 illustrates an embodiment of decoding functionality as may be performed by a communication device. In particular, decoding functionality is presented in conjunction with the frame structure presented in conjunction with FIG. 4.

The moderately long LDPC codewords 404 are decoded before the delayed (e.g., due to de-interleaving) RS codewords 402. Considering the device presented in conjunction with FIG. 5, an outer decoder, such as outer decoder 535 can interoperate with an inner decoder, such as inner decoder 525 in a parallel and pipelined fashion. In particular, the LDPC codewords 404 can be decoded contemporaneously with at least some of the RS codewords 402. In operation, a first LDCP codeword 404 is decoded. After a delay of $\Delta t$ (corresponding to at least the time to collect and decode the first LDPC codeword 404), the results of this inner decoding of the first LDPC codeword 404 are used to generate the partially corrected data to begin outer decoding of the RS codewords 402 in the first group.

For example, consider a 4600 bit LDPC codeword 404 that occupies 2300 QAM symbols, such operation may operate to reduce overall decoder complexity since only 2 bits per QAM symbol are encoded using the moderately long LDPC code. However, the use of such a set partitioned coded modulation may provide for a very powerful coding gain where needed the most—with the least significant bits (LSBs), which undergo the powerful LDPC encoding). As may be understood with respect to this diagram, such an architecture may provide for mitigation of burst related effects, without interleaving, by the elongated LDPC code. Also, the relative time span of LDPC codewords without interleaving may be viewed as matching the relative time span of interleaved RS codewords for efficient burst mitigation and latency (and minimizing complexity).

In certain of the diagrams and/or embodiments herein, 1024 QAM modulation is described. However, it is noted that other alternative embodiments may operate on other using other modulation densities either greater or less than 1024 QAM modulation.

Figure 9:
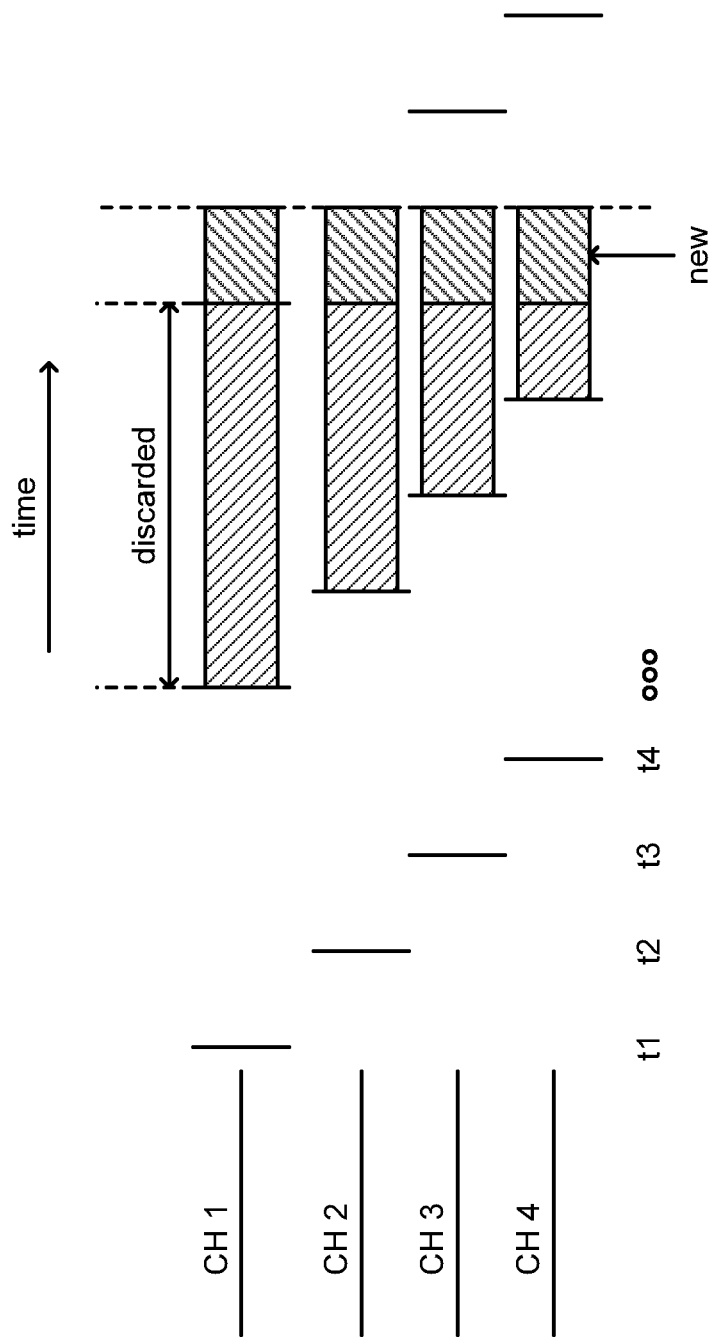
FIG. 9 illustrates an embodiment of codeword buffering as may be performed by a communication device.

FIG. 9 illustrates an embodiment of codeword buffering as may be performed by a communication device. In certain embodiments of a receiver/decoder device, such as the device described in conjunction with FIG. 5, implementing one particular decoding device that is fast enough to process each of a number of respective channels together may provide for a significant reduction in the amount of memory required to process those respective channels.

As shown in FIG. 9, codewords, such as LDCP codewords 404, from 4 different channels (CH 1, CH 2, CH 3, CH 4) are transmitted in a staggering or staggered manner at times t1, t2, t3 and t4 respectively, such that different respective signals or signal portions are received by a given device via multiple channels with respect to a staggered timing relationship. A single processing device may service all of those respective channels provided that the processing device can operate sufficiently fast to process all of those channels together. For example, considering implementation including four channels, if the processing device may operate at four times the speed associated with the fastest channel, then that particular processing device may service all of the respective channels together, successively servicing each respective channel. The latency and memory advantages of systematically and uniformly staggering a multiplicity of more-or-less parallel entities and processing them serially, compared to fully synchronized parallel transmission or randomly staggered, are not limited to codewords and FEC, but rather may be enjoyed beneficially by various communications and system processing functions.

Considering the example presented in conjunction with FIG. 5, a plurality of decoders 512 and/or inner decoders 525 corresponding to a plurality of channels can be implemented via a single processing device. Such channels can include a plurality of multi-carrier or single carrier channels such as DOCSIS 2.0, 3.0 3.1 channels or other DOCSIS channels, or some other combination of channels. In such a situation in which the signal or signal portions are received by the device in a staggered timing relationship, that single processing device may service all those respective channels using a significantly reduced amount of memory.

As shown, results in memory can be discarded when decoding calculations for a particular channel are completed—only to be reused when new codewords arrive. If the number of channels being serviced is M, then the amount of memory required to service those respective M channels is (M+1)/2. Alternatively, rather than implementing the same amount of memory as there are channels, M, by allowing for the use of only a memory of (M+1)/2 to service all of those respective M channels may provide for a savings in memory of almost half.

Generally speaking, the respective signals received via the respective communication channels need not necessarily be part of the same signal. That is to say, they may be provided from more than one different respective transmitting type device. Also generally speaking, these respective signals, if arriving at the receiver/decoder device with the appropriate staggered timing relationship, may undergo processing by one or more respective devices using a significantly reduced memory. For example, if a channel contains a serial string of codewords or discrete-valued modulation symbols (e.g., a sequence of codewords or discrete-valued modulation symbols), then the buffering and/or memory management requirements may be reduced by almost a factor of two (e.g., reduced by a factor of (M+1)/2, where M corresponds to the number of channels).

Also, it is noted that such operation and memory management may generally be applied to any type of processing device. For example, a single demodulator 500 may operate on these respective signals or signal portions received via the respective channels using a significantly reduced memory. Generally speaking, any communication system operating such that different respective signals or signal portions (even operated over a single channel) are received in a staggered timing relationship may use such reduced memory.

It is also noted that even within embodiments in which the respective signals or signal portions received via the respective channels are not received in a staggered timing relationship, the communication device may implement a first memory to store such received signals and output them to a subsequent processing device (e.g., within that same communication device or within another component coupled to that device) in a staggered timing relationship. That subsequent processing device, when receiving the signals or signal portions in a staggered timing relationship may then operate using a corresponding memory, such as a particular memory implemented specifically for that subsequent processing device, with the significantly reduced memory requirement. That is to say, as may be understood, there may be situations in which a chain of different respective processing devices may subsequently operate on the signals or signal portions. In some instances, different respective processing devices each correspondingly have one or more memories associated therewith. Even within a device that does not necessarily receive signals or signal portions and a staggered timing relationship, when different respective processing devices therein may have their own corresponding memories, any one of them may operate with and be implemented with a corresponding memory of significantly reduced size when the signal or signal portions may be provided thereto (e.g., from one or more memories are processing devices upstream within the processing chain) in a staggered timing relationship.

Also, it is generally noted that such staggering of signals or signal portions may be applied to any desired communication system type (e.g., including those described with reference to the FIG. 1, including those which may operate within different types of signaling [such as code division multiple access (CDMA), orthogonal frequency division multiplexing (OFDM), etc.], etc.) that operates within multiple respective channels, or even over a single channel carrying multiple signals. In addition, with respect to co-existence of different respective portions of the frequency spectrum (e.g., which may be associated with different respective communication protocols, standards, and/or recommended practices), different respective channels within that frequency spectrum may be operative using signaling in accordance with a staggered timing relationship. That is to say, different respective channels within the frequency spectrum may operate using a staggered timing relationship. Frequency spectrum may alternatively be considered as a single channel carrying multiple signals, and a staggering relationship may be beneficially used.

For example, within one particular limitation, sharing one relatively fast operating LDPC decoder among multiple channels saves on memory for decoder input. Considering one implementation of 18 modernized DOCSIS channels occupying 102 MHz of available spectrum (e.g., similar to 16 current DOCSIS channels occupying 102 MHz of available spectrum), a significant amount of savings in memory may be achieved.

Considering an example of memory saving with four channels sharing one decoder—only 10/4 LDPC codewords stored at a time (e.g., 5/2 instead of 4). Again, generally speaking, for sharing M channels, a memory of only (M+1)/2 need be employed which will provide for a savings in memory of almost half.

FIG. 10 illustrates an embodiment of a method as may be performed by a communication device. In particular, a method is presented for use in conjunction with one or more functions and features described in conjunction with FIGS. 1-9.

Step 1000 includes outer encoding input data in a cable communication system to generate a first encoded signal. Step 1002 includes inner encoding a subset of the digital information signal to generate a second encoded signal, wherein the inner encoder has a different forward error correction (FEC) than the outer encoder. Step 1004 includes symbol mapping the first encoded signal and the second encoded signal to generate a sequence of discrete-valued modulation symbols.

In an embodiment, the outer encoding includes: generating an FEC encoded signal based on the input data; and generating the first encoded signal by interleaving the FEC encoded signal. The interleaving can include convolutional interleaving. The outer coding can include generating an FEC encoded signal; generating an interleaved encoded signal by interleaving the FEC encoded signal; and generating the first encoded signal from the interleaved encoded signal. The subset of the input data can be a plurality of most significant bits of the input data. The symbol mapping can include processing the first encoded signal as a plurality of most significant bits and the second encoded signal as a plurality of least significant bits to generate the sequence of discrete-valued modulation symbols.

In an embodiment, the outer encoding can include a Reed-Solomon (RS) encoding and the inner encoding includes a low density parity check (LDPC) encoding.

FIG. 11 illustrates an embodiment of a method as may be performed by a communication device. In particular, a method is presented for use in conjunction with one or more functions and features described in conjunction with FIGS. 1-10.

Step 1100 includes processing the sequence of discrete-valued modulation symbols to generate a continuous-time signal for transmission via a cable communication channel. The continuous-time signal can be a set partitioned coded modulation (SPCM) signal.

Figure 12:
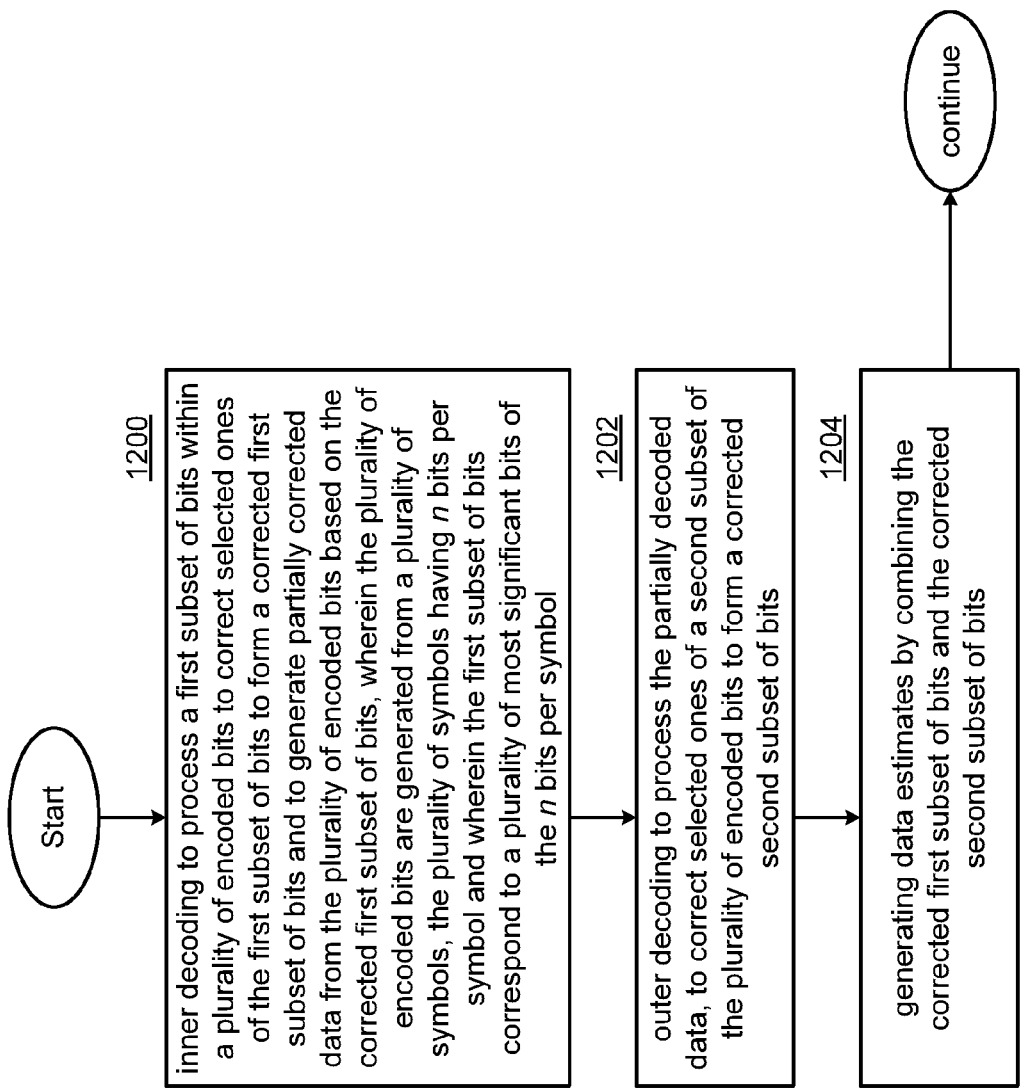
FIG. 12 illustrates an embodiment of a method as may be performed by a communication device.

FIG. 12 illustrates an embodiment of a method as may be performed by a communication device. In particular, a method is presented for use in conjunction with one or more functions and features described in conjunction with FIGS. 1-11.

Step 1200 includes inner decoding to process a first subset of bits within a plurality of encoded bits to correct selected ones of the first subset of bits to form a corrected first subset of bits and to generate partially corrected data from the plurality of encoded bits based on the corrected first subset of bits, wherein the plurality of encoded bits are generated from a plurality of symbols, the plurality of symbols having n bits per symbol and wherein the first subset of bits correspond to a plurality of most significant bits of the n bits per symbol.

Step 1202 includes outer decoding to process the partially decoded data, to correct selected ones of a second subset of the plurality of encoded bits to form a corrected second subset of bits. Step 1204 includes generating data estimates by combining the corrected first subset of bits and the corrected second subset of bits.

In an embodiment, the second subset of the plurality of encoded bits correspond to a plurality of least significant bits of the n bits per symbol. The continuous-time signal can be a set partitioned coded modulation (SPCM) signal. The inner decoding can include generating the corrected first subset of bits for a plurality of different data channels via a single low density parity check (LDPC) decoder. The inner decoding can include generating the corrected first subset of bits via a low density parity check (LDPC) decoding, re-encoding the corrected first subset of bits to form a re-encoded first subset of bits; generating an error detection signal by comparing the re-encoded first subset of bits to the first subset of bits; and generating the partially corrected data based on the error detection signal.

In an embodiment, the outer decoder can include a Reed-Solomon (RS) decoder that generates the corrected second subset of bits, de-interleaving the partially corrected data to generate a plurality of deinterleaved data; and a Reed-Solomon (RS) decoding that generates the corrected second subset of bits, based on the plurality of deinterleaved data.

In an embodiment, the outer includes processing the partially corrected data to generate a plurality of Reed-Solomon encoded data, de-interleaving the plurality of Reed-Solomon encoded data to generate a plurality of deinterleaved data, and generating the corrected second subset of bits, by decoding the plurality of deinterleaved data.

It is also noted that the various operations and functions as described with respect to various methods herein may be performed within any of a number of types of communication devices, such as using a baseband processing module and/or a processing module implemented therein, and/or other components therein. For example, such a baseband processing module and/or processing module can generate such signals and perform such operations, processes, etc. as described herein as well as perform various operations and analyses as described herein, or any other operations and functions as described herein, etc. or their respective equivalents.

In some embodiments, such a baseband processing module and/or a processing module (which may be implemented in the same device or separate devices) can perform such processing, operations, etc. in accordance with various aspects of the various embodiments, and/or any other operations and functions as described herein, etc. or their respective equivalents. In some embodiments, such processing is performed cooperatively by a first processing module in a first device, and a second processing module within a second device. In other embodiments, such processing, operations, etc. are performed wholly by a baseband processing module and/or a processing module within one given device. In even other embodiments, such processing, operations, etc. are performed using at least a first processing module and a second processing module within a singular device.

As may also be used herein, the term(s) "coupled to", and/or "coupling" includes direct coupling between items and/or indirect coupling between items via an intervening item (e.g., an item includes, but is not limited to, a component, an element, a circuit, and/or a module) where, for indirect coupling, the intervening item does not modify the information of a signal but may adjust its current level, voltage level, and/or power level. As may further be used herein, inferred coupling (i.e., where one element is coupled to another element by inference) includes direct and indirect coupling between two items in the same manner as "coupled to".

As may also be used herein, the terms "processing module", "module", "processing circuit", and/or "processing unit" (e.g., including various modules and/or circuitries such as may be operative, implemented, and/or for encoding, for decoding, for baseband processing, etc.) may be a single processing device or a plurality of processing devices. Such a processing device may be a microprocessor, micro-controller, digital signal processor, microcomputer, central processing unit, field programmable gate array, programmable logic device, state machine, logic circuitry, analog circuitry, digital circuitry, and/or any device that manipulates signals (analog and/or digital) based on hard coding of the circuitry and/or operational instructions. The processing module, module, processing circuit, and/or processing unit may have an associated memory and/or an integrated memory element, which may be a single memory device, a plurality of memory devices, and/or embedded circuitry of the processing module, module, processing circuit, and/or processing unit. Such a memory device may be a read-only memory (ROM), random access memory (RAM), volatile memory, non-volatile memory, static memory, dynamic memory, flash memory, cache memory, and/or any device that stores digital information. Note that if the processing module, module, processing circuit, and/or processing unit includes more than one processing device, the processing devices may be centrally located (e.g., directly coupled together via a wired and/or wireless bus structure) or may be distributedly located (e.g., cloud computing via indirect coupling via a local area network and/or a wide area network). Further note that if the processing module, module, processing circuit, and/or processing unit implements one or more of its functions via a state machine, analog circuitry, digital circuitry, and/or logic circuitry, the memory and/or memory element storing the corresponding operational instructions may be embedded within, or external to, the circuitry comprising the state machine, analog circuitry, digital circuitry, and/or logic circuitry. Still further note that, the memory element may store, and the processing module, module, processing circuit, and/or processing unit executes, hard coded and/or operational instructions corresponding to at least some of the steps and/or functions illustrated in one or more of the Figures. Such a memory device or memory element can be included in an article of manufacture.

The various embodiments has been described above with the aid of method steps illustrating the performance of specified functions and relationships thereof. The boundaries and sequence of these functional building blocks and method steps have been arbitrarily defined herein for convenience of description. Alternate boundaries and sequences can be defined so long as the specified functions and relationships are appropriately performed. Any such alternate boundaries or sequences are thus within the scope and spirit of the claims. Further, the boundaries of these functional building blocks have been arbitrarily defined for convenience of description. Alternate boundaries could be defined as long as the certain significant functions are appropriately performed. Similarly, flow diagram blocks may also have been arbitrarily defined herein to illustrate certain significant functionality. To the extent used, the flow diagram block boundaries and sequence could have been defined otherwise and still perform the certain significant functionality. Such alternate definitions of both functional building blocks and flow diagram blocks and sequences are thus within the scope and spirit of the claims. One of average skill in the art will also recognize that the functional building blocks, and other illustrative blocks, modules and components herein, can be implemented as illustrated or by discrete components, application specific integrated circuits, processors executing appropriate software and the like or any combination thereof.

The various embodiments may have also been described, at least in part, in terms of one or more embodiments. An embodiment of the various embodiments is used herein to illustrate the various embodiments, an aspect thereof, a feature thereof, a concept thereof, and/or an example thereof. A physical embodiment of an apparatus, an article of manufacture, a machine, and/or of a process that embodies the various embodiments may include one or more of the aspects, features, concepts, examples, etc. described with reference to one or more of the embodiments discussed herein. Further, from figure to figure, the embodiments may incorporate the same or similarly named functions, steps, modules, etc. that may use the same or different reference numbers and, as such, the functions, steps, modules, etc. may be the same or similar functions, steps, modules, etc. or different ones.

Unless specifically stated to the contra, signals to, from, and/or between elements in a figure of any of the figures presented herein may be analog or digital, continuous time or discrete time, and single-ended or differential. For instance, if a signal path is shown as a single-ended path, it also represents a differential signal path. Similarly, if a signal path is shown as a differential path, it also represents a single-ended signal path. While one or more particular architectures are described herein, other architectures can likewise be implemented that use one or more data buses not expressly shown, direct connectivity between elements, and/or indirect coupling between other elements as recognized by one of average skill in the art.

The term "module" is used in the description of the various embodiments of the various embodiments. A module includes a functional block that is implemented via hardware to perform one or module functions such as the processing of one or more input signals to produce one or more output signals. The hardware that implements the module may itself operate in conjunction software, and/or firmware. As used herein, a module may contain one or more sub-modules that themselves are modules.

While particular combinations of various functions and features of the various embodiments have been expressly described herein, other combinations of these features and functions are likewise possible. The various embodiments are not limited by the particular examples disclosed herein and expressly incorporate these other combinations.

What is claimed is:

1. An apparatus, comprising:
a demodulator to process a continuous-time signal to generate a plurality of encoded bits, the plurality of encoded bits are generated from a plurality of symbols, the plurality of symbols having n bits per symbol;
an inner decoder to process a first subset of bits within the plurality of encoded bits to correct selected ones of the first subset of bits to form a corrected first subset of bits and to generate partially corrected data from the plurality of encoded bits based on the corrected first subset of bits, wherein the first subset of bits correspond to a plurality of least significant bits of the n bits per symbol;
an outer decoder to process the partially corrected data, to correct selected ones of a second subset of the plurality of encoded bits to form a corrected second subset of bits; and
a bit combiner to generate data estimates by combining the corrected first subset of bits and the corrected second subset of bits.

2. The apparatus of claim 1, wherein:
the second subset of the plurality of encoded bits correspond to a plurality of most significant bits of the n bits per symbol.

3. The apparatus of claim 1, wherein:
the continuous-time signal is a set partition coded modulation (SPCM) signal.

4. The apparatus of claim 1, wherein:
the plurality of encoded bits are generated from one of a plurality of different data channels; and
the inner decoder includes a low density parity check (LDPC) decoder that generates the corrected first subset of bits for the plurality of different data channels.

5. The apparatus of claim 1, wherein the inner decoder includes:
a low density parity check (LDPC) decoder that generates the corrected first subset of bits.

6. The apparatus of claim 5, wherein the inner decoder further includes:
a low density parity check (LDPC) encoder that re-encodes the corrected first subset of bits to form a re-encoded first subset of bits;
an error detector, coupled to the low density parity check (LDPC) encoder, that generates an error detection signal by comparing the re-encoded first subset of bits to the first subset of bits; and
a bit corrector, coupled to the error detector, that generates the partially corrected data based on the error detection signal.

7. The apparatus of claim 1, wherein the outer decoder includes:
a Reed-Solomon (RS) decoder that generates the corrected second subset of bits.

8. The apparatus of claim 1, wherein the outer decoder includes:
a deinterleaver, that de-interleaves the partially corrected data to generate a plurality of deinterleaved data; and
a Reed-Solomon (RS) decoder that generates the corrected second subset of bits, based on the plurality of deinterleaved data.

9. The apparatus of claim 1, wherein the outer decoder includes:
a symbol converter that processes the partially corrected data to generate a plurality of Reed-Solomon encoded data;
a deinterleaver, that de-interleaves the plurality of Reed-Solomon encoded data to generate a plurality of deinterleaved data; and
a Reed-Solomon (RS) decoder that generates the corrected second subset of bits, based on the plurality of deinterleaved data.

10. A method comprising:
inner decoding to process a first subset of bits within a plurality of encoded bits to correct selected ones of the first subset of bits to form a corrected first subset of bits and to generate partially corrected data from the plurality of encoded bits based on the corrected first subset of bits, wherein the plurality of encoded bits are generated from a plurality of symbols, the plurality of symbols having n bits per symbol and wherein the first subset of bits correspond to a plurality of most significant bits of the n bits per symbol;
outer decoding to process the partially corrected data, to correct selected ones of a second subset of the plurality of encoded bits to form a corrected second subset of bits, wherein the second subset of the plurality of encoded bits correspond to a plurality of most significant bits of the n bits per symbol; and generating data estimates by combining the corrected first subset of bits and the corrected second subset of bits.

11. The method of claim 10, wherein:

the plurality of encoded bits are demodulated from a set partition coded modulation (SPCM) signal.

12. The method of claim 10, wherein the inner decoding includes:

generating the corrected first subset of bits for a plurality of different data channels via a single low density parity check (LDPC) decoder.

13. The method of claim 10, wherein the inner decoding includes:

generating the corrected first subset of bits via a low density parity check (LDPC) decoding.

14. The method of claim 13, wherein the inner decoding further includes:

re-encoding the corrected first subset of bits to form a re-encoded first subset of bits via a low density parity check (LDPC) encoder;

generating an error detection signal by comparing the re-encoded first subset of bits to the first subset of bits; and generating the partially corrected data based on the error detection signal.

15. The method of claim 10, wherein the outer decoding includes:

a Reed-Solomon (RS) decoder that generates the corrected second subset of bits.

16. The method of claim 10, wherein the outer decoding includes:

de-interleaving the partially corrected data to generate a plurality of deinterleaved data; and a Reed-Solomon (RS) decoding that generates the corrected second subset of bits, based on the plurality of deinterleaved data.

17. The method of claim 10, wherein the outer decoding includes:

processing the partially corrected data to generate a plurality of Reed-Solomon encoded data;

de-interleaving the plurality of Reed-Solomon encoded data to generate a plurality of deinterleaved data; and generating the corrected second subset of bits, by decoding the plurality of deinterleaved data.

18. An apparatus, comprising:

a demodulator to process a continuous-time signal from a plurality of downstream cable channels to generate a plurality of encoded bits, the plurality of encoded bits are generated from a plurality of symbols, the plurality of symbols having n bits per symbol;

an inner decoder to process a first subset of bits within the plurality of encoded bits to correct selected ones of the first subset of bits to form a corrected first subset of bits and to generate partially corrected data from the plurality of encoded bits based on the corrected first subset of bits, wherein the first subset of bits correspond to a plurality of least significant bits of the n bits per symbol;

an outer decoder to process the partially corrected data, to correct selected ones of a second subset of the plurality of encoded bits to form a corrected second subset of bits; and a bit combiner to generate data estimates by combining the corrected first subset of bits and the corrected second subset of bits.

19. The apparatus of claim 18, wherein:

the continuous-time signal is a set partition coded modulation (SPCM) signal.

20. The apparatus of claim 18, wherein:

the plurality of encoded bits are generated from one of a plurality of different data channels; and the inner decoder includes a low density parity check (LDPC) decoder that generates the corrected first subset of bits for the plurality of different data channels.

* * * * *